United States Patent [19]
Ikeda et al.

[11] Patent Number: 5,539,444
[45] Date of Patent: Jul. 23, 1996

[54] APPARATUS FOR RECORDING AN IMAGE BY IRRADATING A PLURALITY OF LIGHT BEAMS ON A RECORDING SURFACE

[75] Inventors: Masahide Ikeda; Hiroshi Iwasa, both of Kyoto, Japan

[73] Assignee: Dainippon Screen Mfg. Co., Ltd., Japan

[21] Appl. No.: 164,387

[22] Filed: Dec. 9, 1993

[30] Foreign Application Priority Data

Dec. 15, 1992 [JP] Japan ................... 4-354645

[51] Int. Cl.$^6$ ................................. B41J 2/47
[52] U.S. Cl. ....................................... 347/241
[58] Field of Search ................... 347/241, 256, 347/258, 134

[56] References Cited

U.S. PATENT DOCUMENTS

| | | | |
|---|---|---|---|
| 4,268,871 | 5/1981 | Kawamura | 358/291 |
| 4,743,091 | 5/1988 | Gelbart | 350/252 |
| 4,884,857 | 12/1989 | Prakash et al. | 359/204 |

FOREIGN PATENT DOCUMENTS

| | | |
|---|---|---|
| 5131676 | 5/1993 | Japan . |
| 5333282 | 12/1993 | Japan . |
| 5333269 | 12/1993 | Japan . |

*Primary Examiner*—Mark J. Reinhart
*Attorney, Agent, or Firm*—Ostrolenk, Faber, Gerb & Soffen

[57] ABSTRACT

An aperture plate is disposed between a reduction optical system (imaging optical system) and a light source unit in which a plurality of light source parts each emitting a light beam are arranged in a predetermined arrangement pattern. In the aperture plate, a plurality of apertures are arranged in the same pattern as the arrangement pattern of the light source parts. Light beams from the light source parts are directed toward the reduction optical system through the apertures which face the respective light source parts so that reduction images of the apertures are formed on a photosensitive material. Even if the light source parts are located a little displaced from a predetermined arrangement pattern, images of the apertures will be focused on a photosensitive material. This enables easy adjustment of the locations of the light source parts and recording of a high quality image.

20 Claims, 16 Drawing Sheets

APPARATUS FOR RECORDING AN IMAGE BY IRRADATING A PLURALITY OF LIGHT BEAMS ON A RECORDING SURFACE

BACKGROUND OF THE INVENTION

1. Field of the Invention

The present invention relates to a multibeam recording apparatus for irradiating a plurality of light beams onto a recording surface.

2. Description of the Background Art

FIG. 17 is a view of a conventional multibeam recording apparatus. The multibeam recording apparatus is comprised of a light source unit 90 in which a plurality of light source parts 91 are arranged in a predetermined arrangement pattern, and a reduction optical system (imaging optical system) 92 for reducing a plurality of light beams from the light source unit 90 and irradiating the reduced light beams onto a photosensitive material (recording surface) PM.

Each light source part 91 comprises a semiconductor laser 93 and a collimating lens 94 which are fixed to the main body of the light source part (not shown). A light beam from the semiconductor laser 93 is collimated into a parallel light beam by the collimating lens 94 to be thereafter emitted from a tip portion of the main body of the light source part (which is generally indicated at 95 in FIG. 1) toward the reduction optical system 92. Here, the tip portion 95 of the main body of the light source part functions as an aperture which cuts an unwanted portion of the parallel light beam.

The reduction optical system 92 is comprised of a plurality of optical elements. For example, as shown in FIG. 1, receiving parallel light beams which travel parallel to an optical axis Z from the light source parts 91 and which have at predetermined pitches P, the reduction optical system 92 reduces the light beams at an appropriate magnification M and irradiates parallel light beams which have beam pitches BP (=P·M) and which advance parallel to the optical axis Z onto the photosensitive material PM.

Hence, by moving the photosensitive material PM in a primary scanning direction X (which is perpendicular to the plane of FIG. 17) while step feeding the light source unit 90 and the reduction optical system 92 in a sub scanning direction Y, a two-dimensional image is recorded on the photosensitive material PM.

If high quality recording of a predetermined image using the multibeam recording apparatus having such a construction above is desired, the light beams from the respective light source parts 91 must travel parallel to the optical axis Z of the reduction optical system 92 and the light source parts 91 must be arranged with equal distances from each other (i.e., constant pitches P). If these requirements are not satisfied, light beam spots will not be formed equidistant from each other on the photosensitive material PM, resulting in a varied quality image recorded on the photosensitive material PM.

For this reason, in the conventional multibeam recording apparatus, the direction of the light beams from the respective light source parts 91 must be adjusted and the light source parts 91 must be arranged with a high accuracy in a predetermined arrangement pattern (with constant pitches P in the example described above), which requires a long time.

SUMMARY OF THE INVENTION

The present invention is directed to a multibeam recording apparatus for irradiating a plurality of light beams onto a recording surface to recording an image. The multibeam recording apparatus comprises: a light source unit including a plurality of light source parts which are arranged in a first arrangement pattern, each of the light source parts emitting a single light beam; an imaging optical system having an optical axis, the imaging optical system dispose between the light source unit and the recording surface; and an aperture plate having a plurality of apertures which are arranged in a second arrangement pattern identical or similar to the first arrangement pattern, the aperture plate being disposed between the light source unit and the imaging optical system so that each of the apertures is faced the corresponding light source part.

According to a preferred embodiment of the present invention, the light source parts are disposed on a flat surface substantially perpendicular to the optical axis, the aperture plate is formed in the configuration of the flat surface and the first and second arrangement patterns are identical to each other.

According to another preferred embodiment of the present invention, the light source parts are disposed on the spherical surface and the aperture plate is formed in the configuration of the spherical surface, and wherein the second arrangement pattern is similar to the first arrangement pattern.

Accordingly, it is an object of the present invention to offer a multibeam recording apparatus which records a high quality image with simple adjustment.

These and other objects, features, aspects and advantages of the present invention will become more apparent from the following detailed description of the present invention when taken in conjunction with the accompanying drawings.

DESCRIPTION OF THE PREFERRED EMBODIMENTS

A. First Preferred Embodiment

Figure 1:
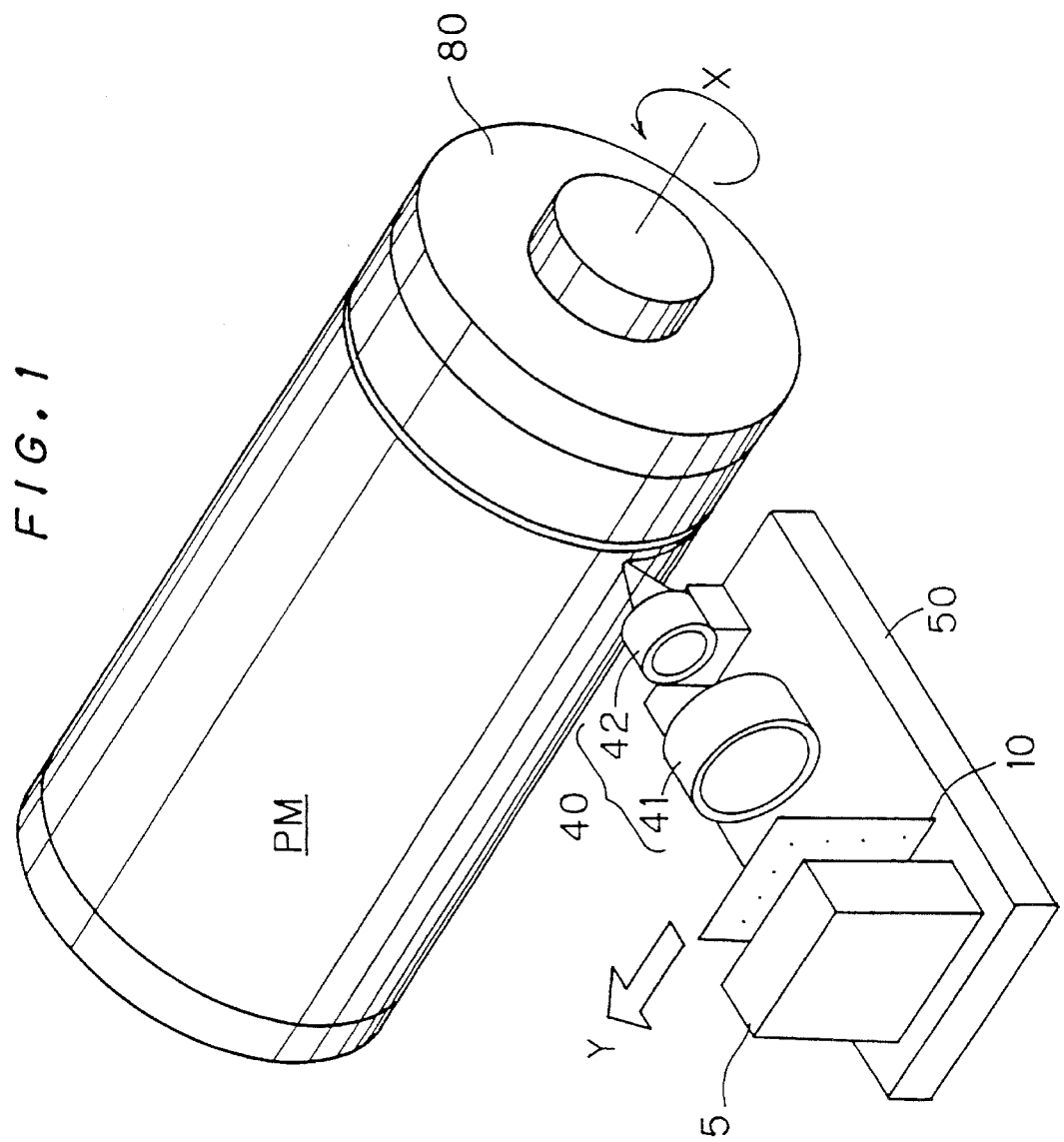
FIG. 1 is a perspective view showing the appearance of a multibeam recording apparatus according to a first preferred embodiment of the present invention.

FIG. 1 is a perspective view of a multibeam recording apparatus according to a first preferred embodiment of the present invention. In the multibeam recording apparatus, a light source unit 5 for emitting a plurality of light beams, an aperture plate 10 and a reduction optical system (imaging optical system) 40 which is formed by two lenses 41 and 42 are fixed on a base 50 which is movable in a sub scanning direction Y. The base 50 is mechanically connected with a driving unit (not shown). This allows that when driven by the driving unit, the base 50 moves in the subscanning direction Y so that the light source unit 5, the aperture plate 10 formed in the configuration of the flat surface and the reduction optical system (imaging optical system) 40 move as one unit in the sub scanning direction Y. The multibeam recording apparatus also comprises a rotation cylinder 80 which is disposed for free rotation in a primary scanning direction X. Hence, recording of a two-dimensional image on a photosensitive material PM is attained by rotating the rotation cylinder 80 in the primary scanning direction X with the photosensitive material PM wound around the same and a plurality of light beams from the light source unit 5 irradiated upon the same through the aperture plate 10 and the reduction optical system 40 while step feeding the base 50 in the sub scanning direction Y.

Figure 2:
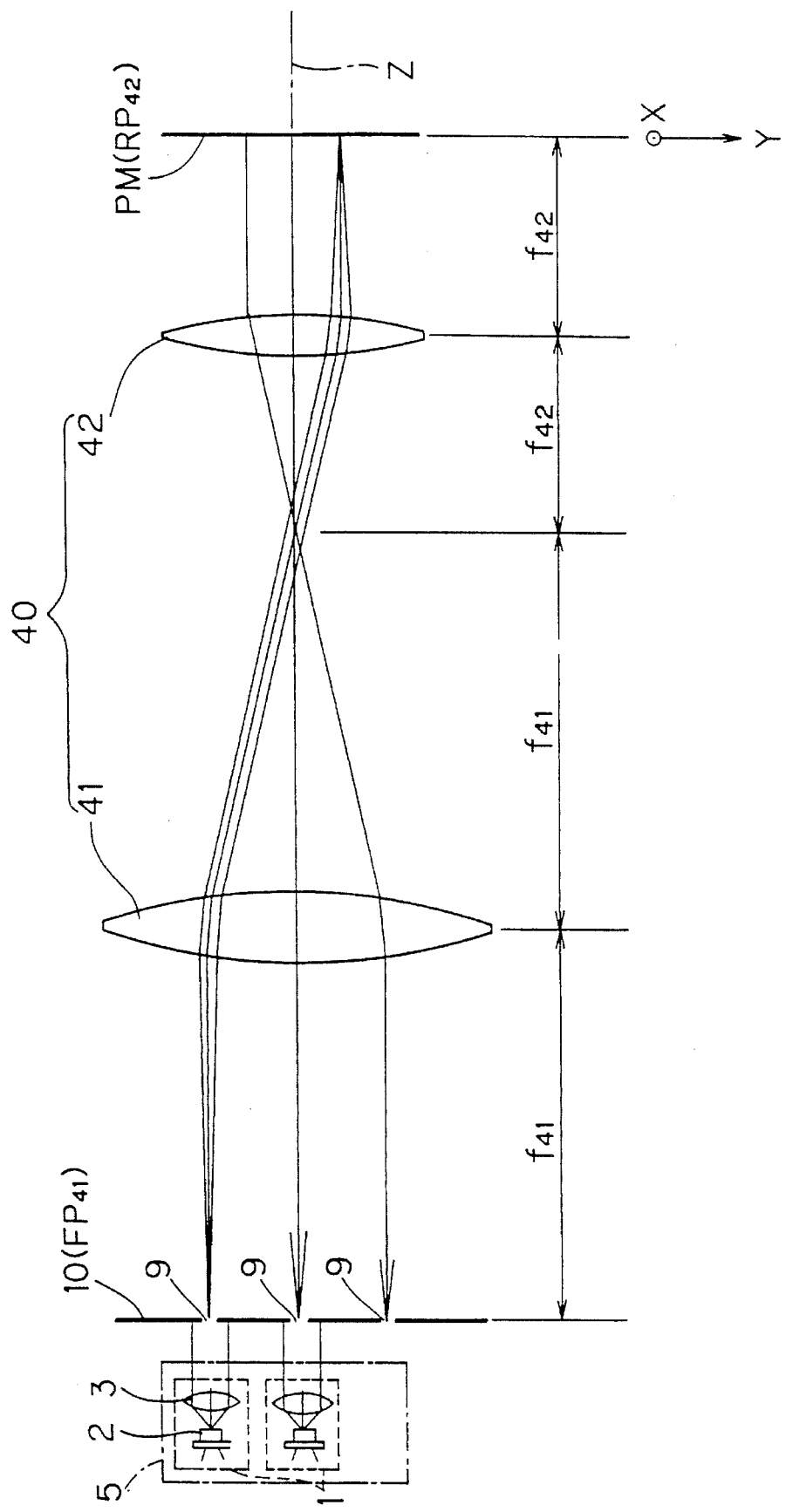
FIG. 2 is a view showing an optical system of the multibeam recording apparatus of FIG. 1.

FIG. 2 is a view showing an optical system of the multibeam recording apparatus of FIG. 1. In FIG. 2, the light source unit 5 comprises a plurality of light source parts 1. Each light source part 1 is comprised of a semiconductor laser 2 and a collimating lens 3 for collimating a light beam from the semiconductor laser 2. Between the light source unit 5 and the reduction optical system 40, the aperture plate 10 in which a plurality of apertures 9 are bored is located.

Figure 3A:
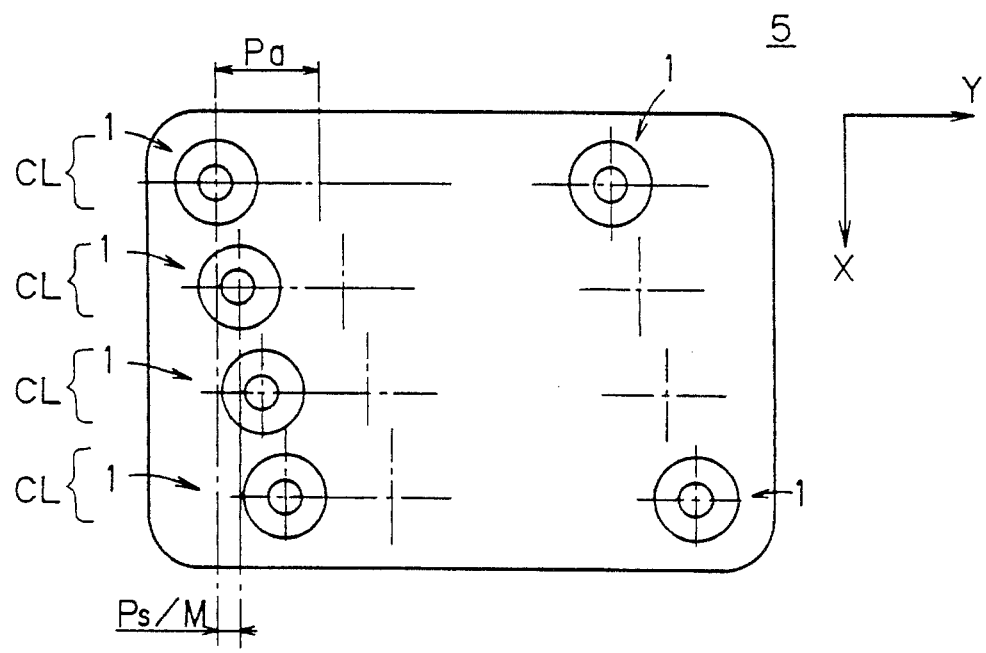
FIGS. 3A and 3B are front view of a light source unit and an aperture plate.
Figure 3B:
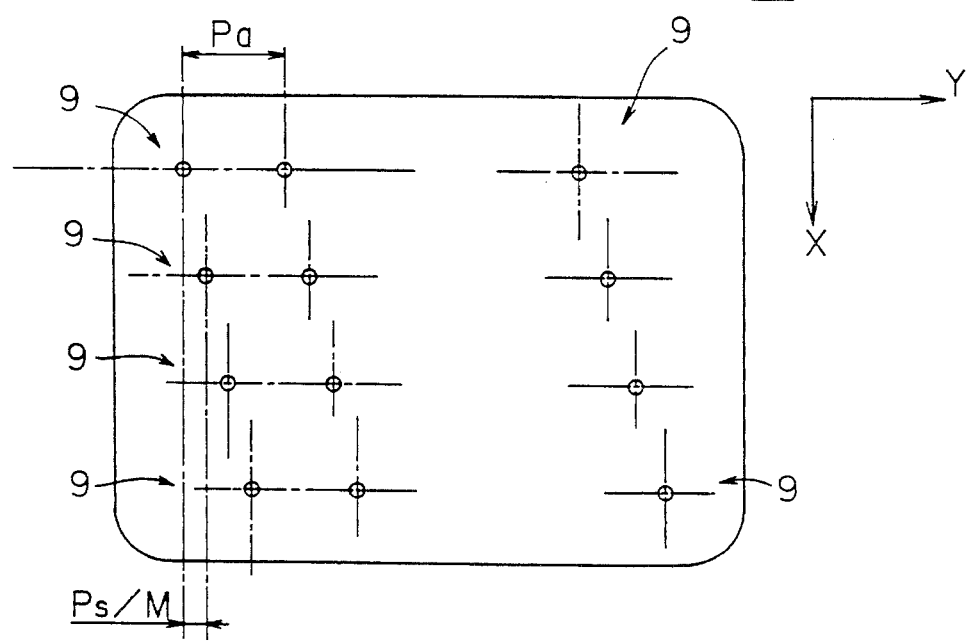

FIGS. 3A and 3B are front views of the light source unit 5 and the aperture plate 10. FIG. 3A shows a relation of arrangement (arrangement pattern) of the light source parts 1 within the light source unit 5 while FIG. 3B shows a relation of arrangement (arrangement pattern) of the apertures 9 in the aperture plate 10. In the light source unit 5, the plurality of the light source parts 1 are arranged at constant pitches Pa in the sub scanning direction Y to define one column CL. The columns CL of the light source parts 1 are located next to each other in the primary scanning direction X in such a manner that ends of adjacent columns CL are positioned a distance of Ps/M. The apertures 9 are arranged in an identical pattern to the light source parts 1 so that each light source part 1 of the light source unit 5 and each aperture 9 of the aperture plate 10 correspond to each other. The aperture plate 10 is formed by opening the apertures 9 with regular spacings from each other in one black metal plate, which is done easily and accurately by a state-of-the-art technique.

The aperture plate 10 having such a structure is disposed at a front focal plane $FP_{41}$ of the lens 41 in such a manner that the apertures 9 face the light source parts 1 of the light source unit 5 (FIG. 2).

In the reduction optical system 40, the lenses 41 and 42 are located so that a rear focal plane of the lens 41 (which has a focal length $f_{41}$) coincides with a front focal plane of the lens 42 (which has a focal length $f_{42}$). Thus, the reduction optical system 40 is a so-called afocal optical system. The photosensitive material (i.e., recording surface) PM is located at a rear focal plane $RP_{42}$ of the lens 42.

Hence, in the first preferred embodiment, the aperture plate 10 and the photosensitive material PM are in optical conjugation. The images of the apertures 9 of the aperture plate 10 are reduced at the magnification M ($=f_{42}/f_{41}$) of the reduction optical system 40 and imaged on the material PM.

As described above, in the multibeam recording apparatus according to the first preferred embodiment, since the apertures 9 are arranged in the aperture plate 10 in the same manner in which the light source parts 1 are arranged and such aperture plate 10 is located between the light source unit 5 and the reduction optical system 40, the light source parts 1 are adjusted easily in the light source unit 5. More particularly, this is because only if the light beams from the light source parts 1 are parallel to the optical axis Z and at least a portion of each light beam is irradiated upon the corresponding aperture 9, the image of each apertures 9 will be formed at predetermined location. That is, as far as the conditions above are satisfied, even if the light source parts 1 are a little displaced in the direction of the optical axis Z or in the directions X and Y which are perpendicular to the optical axis Z, light beam spots (i.e., the images of the apertures 9) having a similar pattern to the arrangement of the apertures 9 will be always formed on the photosensitive material PM. Hence, the quality of a resulting image will not be degraded even if adjustment of the light source parts 1 is not very accurate.

Figure 4:
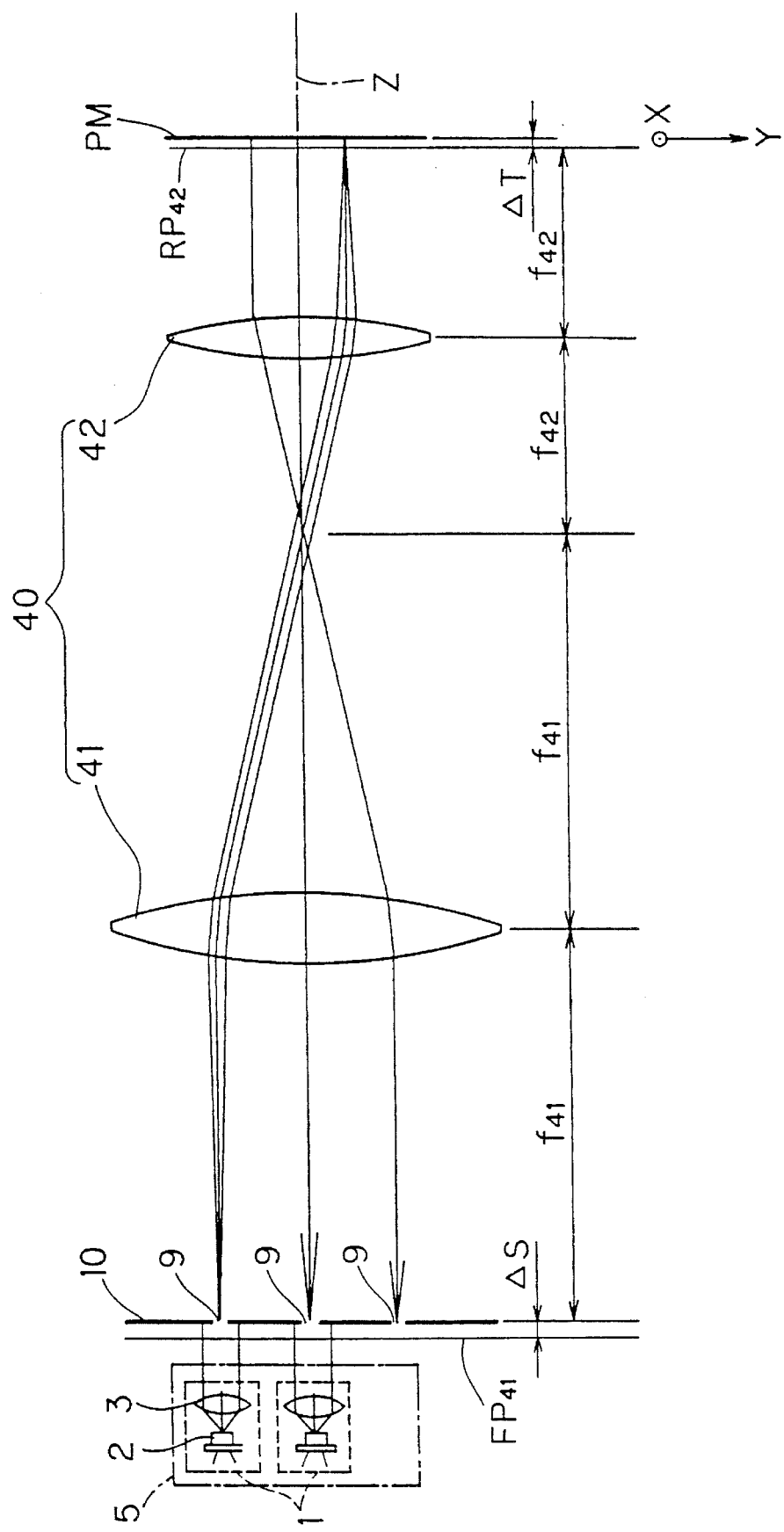
FIG. 4 is a view showing a modification of the multibeam recording apparatus of the first preferred embodiment of the present invention.

In the first preferred embodiment, as shown in FIG. 2, the aperture plate 10 and the photosensitive material PM are brought into optical conjugation with each other by coinciding the aperture plate 10 with the front focal plane $FP_{41}$ of the lens 41 and coinciding the photosensitive material (i.e., recording surface) PM with the rear focal plane $RP_{42}$ of the lens 42. However, optical conjugation of the aperture plate 10 and the photosensitive material PM can be also attained by arranging the aperture plate 10, the reduction optical system 40 and the photosensitive material PM otherwise. For example, as shown in FIG. 4, when the aperture plate 10 is located with a displacement in a direction parallel to the optical axis Z by a distance $\Delta S$ from its location in the arrangement shown in FIG. 2, by moving the photosensitive material PM along the optical axis Z as a distance $\Delta T$ which is obtained by the distance $\Delta S$ times a square of the magnification M ($=f_{42}/f_{41}$) of the reduction optical system 40 (i.e., $\Delta T = (f_{42}\ f_{41})^2 \cdot \Delta S$), optical conjugation of the aperture plate 10 and the photosensitive material PM is achieved.

The equation above ($\Delta T = (f_{42}/f_{42})^2 \cdot \Delta S$) also indicates that the apparatus according to the first preferred embodiment is relatively easily completed. This is because due to a fact that the magnification M ($=f_{42}/f_{41}$) of the reduction optical system (imaging optical system) 40 of the multibeam recording apparatus is around $1/100$ to $1/1000$ in general, even if the aperture plate 10 is displaced in the direction parallel to the optical axis Z by the distance $\Delta S$, the location of the photosensitive material PM so as to be in optical conjugation with the aperture plate 10 will be displaced only by $1/10^4$ to $1/10^6$ of $\Delta S$ in the direction of the optical axis Z. Such a little displacement is equal to almost no influence on the quality of an image, and therefore, positioning of the aperture plate 10 needs not be very accurate.

Figure 5:
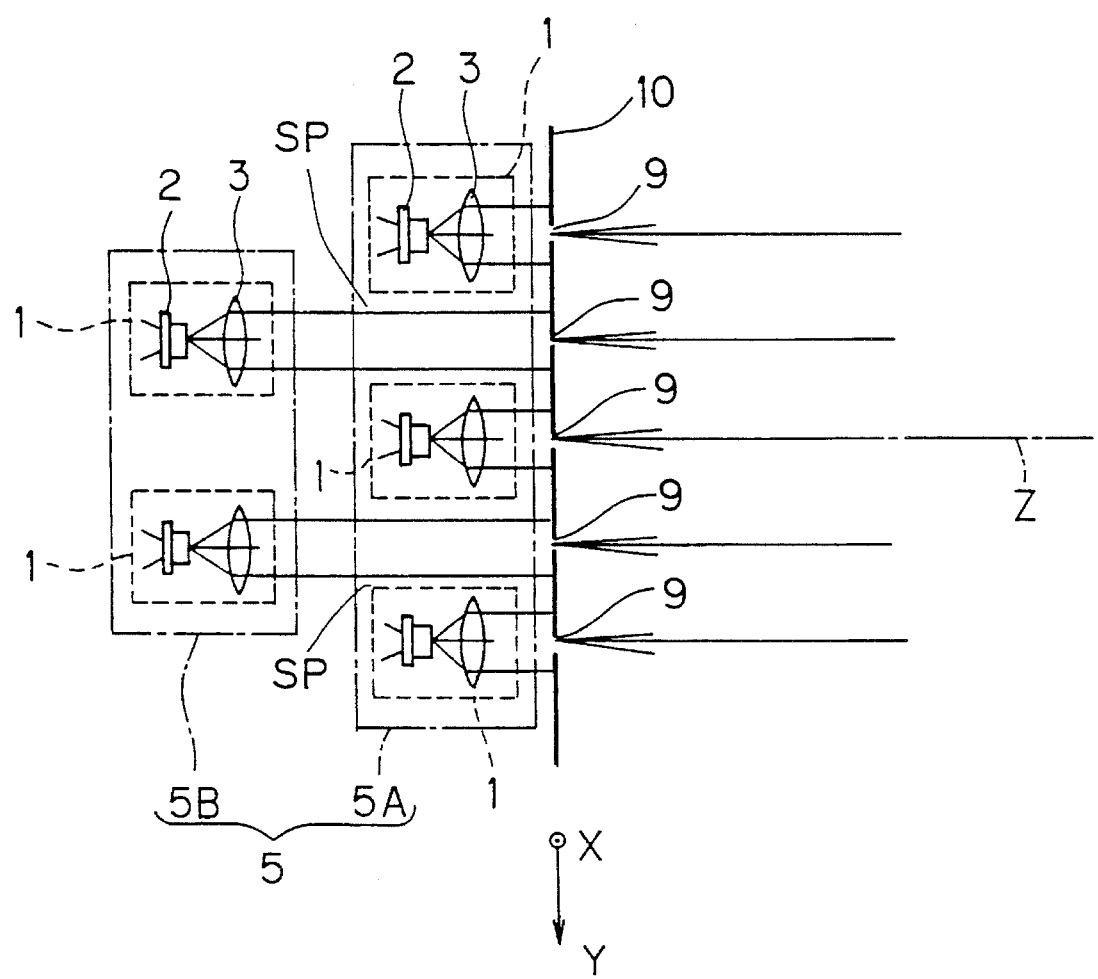
FIG. 5 is a view showing the multibeam recording apparatus of the first preferred embodiment having an improved structure.

FIG. 5 is a view showing the multibeam recording apparatus of the first preferred embodiment with an improved structure. In this improved structure, the light source unit 5 is formed by two light source arrays 5A and 5B which are arranged in the direction parallel to the optical axis Z. Each one of the light source arrays 5A and 5B includes a plurality of light source parts 1 which are arranged in a predetermined arrangement pattern. While light beams from the light source array 5A are irradiated directly upon the aperture plate 10, light beams from the light source array 5B pass through spaces SP between the light source parts 1 of the light source array 5A before reaching the aperture plate 10.

Where a plurality of the light source arrays 5A and 5B are positioned at different locations on the optical axis Z within the light source unit 5, an increased number of the light source parts 1 can be arranged in a reduced space. For instance, between a structure where a certain number of the light source parts 1 are arranged in one plane (i.e., an XY plane) which is perpendicular to the optical axis Z as shown in FIG. 2 and a structure where the same number of the light source parts 1 are arranged in the two different light source arrays 5A and 5B as shown in FIG. 5, resulting in smaller pitches of the light beams from the light source unit 5, resulting in reduction in the sizes of the lenses 41 and 42 which form the reduction optical system 40. Although the light source unit 5 is formed by the two light source arrays 5A and 5B in this improved structure, it is to be noted that the light source unit 5 may consist of three or more light source arrays, which is needless to mention.

B. Second Preferred Embodiment

Figure 6:
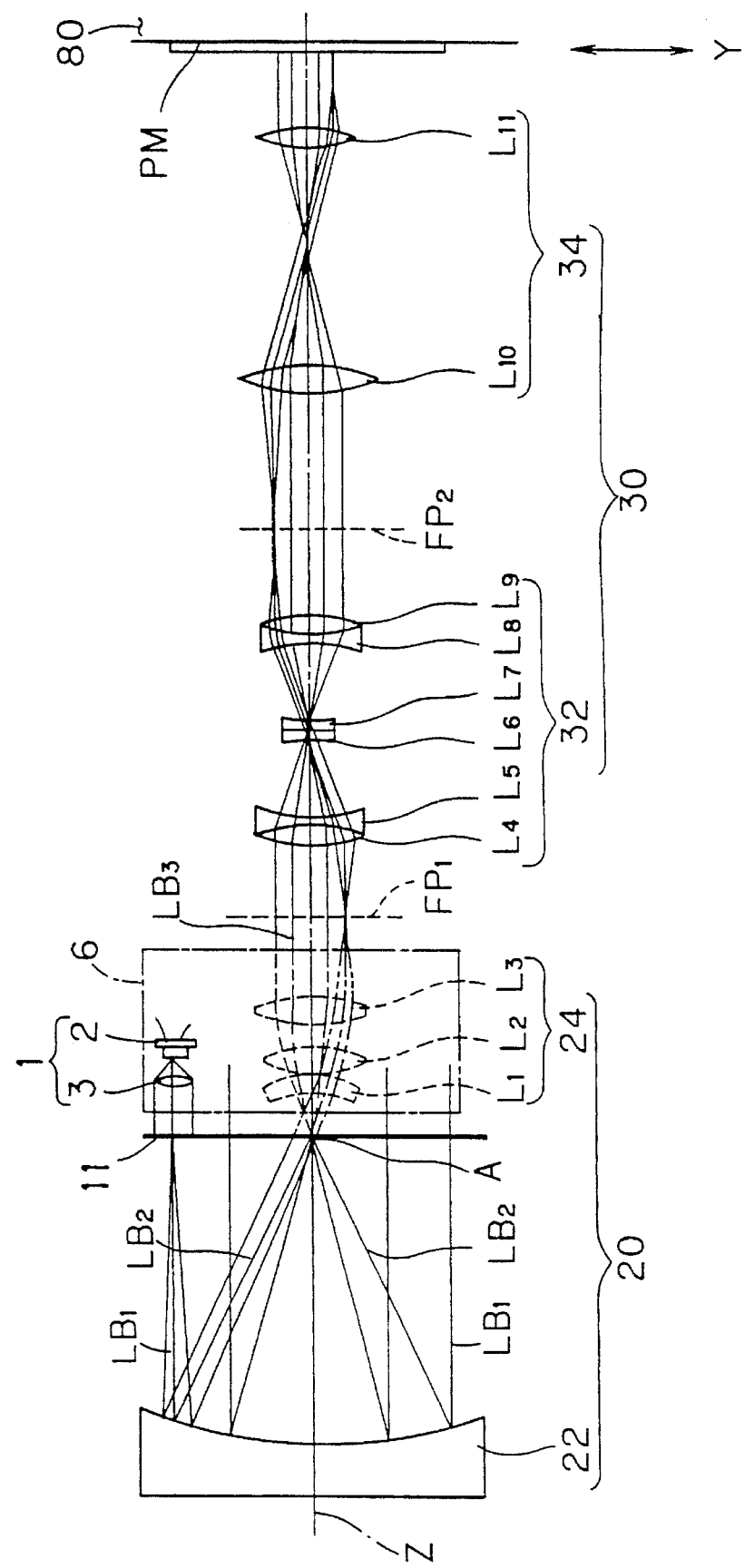
FIG. 6 is a plan view of a multibeam recording apparatus according to a second preferred embodiment of the present invention.
Figure 7:
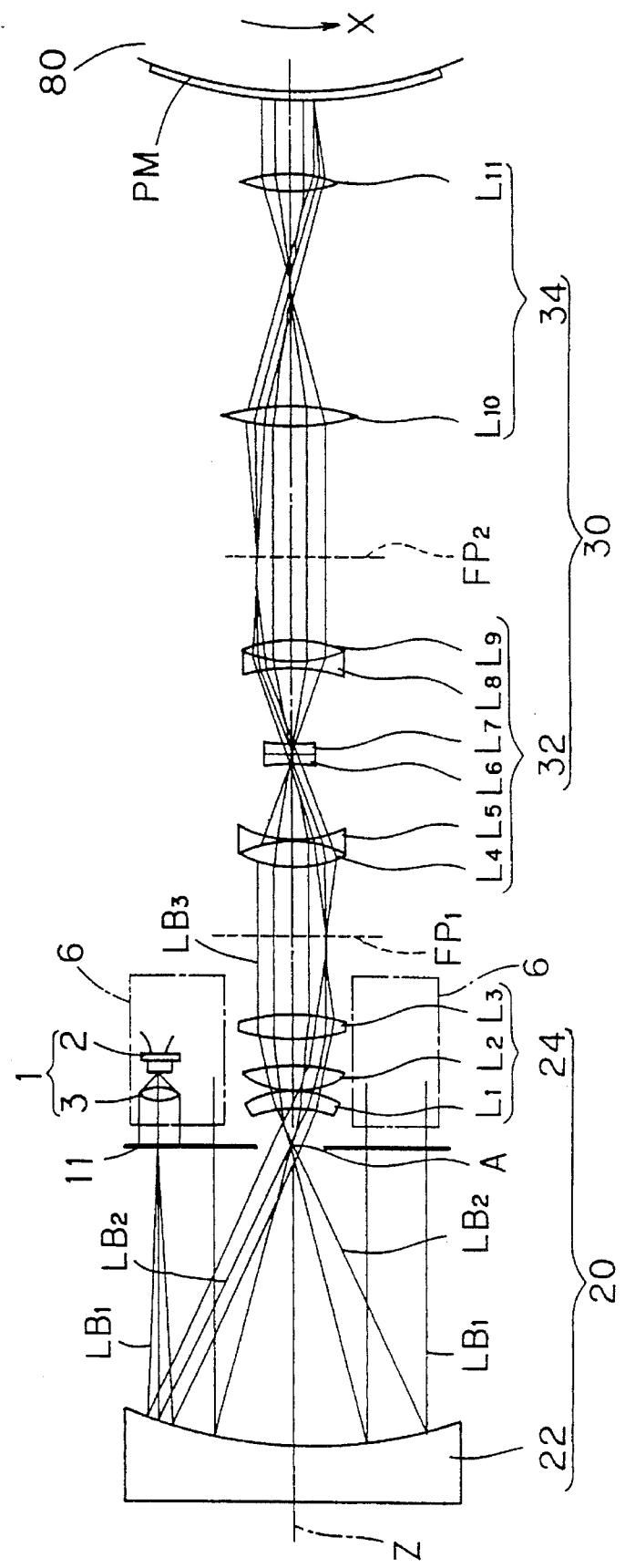
FIG. 7 is a side view of a multibeam recording apparatus according to the second preferred embodiment of the present invention.

FIGS. 6 and 7 are a plan view and a side view, respectively, of a multibeam recording apparatus according to a second preferred embodiment of the present invention. This multibeam recording apparatus is comprised of a light source unit 6 for emitting a plurality of light beams, a reduction optical system (imaging optical system) 20, an afocal optical system 30 and a rotation cylinder 80. A photosensitive material PM is wound around the rotation cylinder 80 and the rotation cylinder 80 is rotated in the primary scanning direction X while light beams from the light source unit 6 are swept through the reduction optical system 20 and the afocal optical system 30 in synchronism with the rotation of the rotation cylinder 80 in the sub scanning direction Y which runs approximately perpendicular to the primary scanning direction X. As a result, a desired image is recorded on the photosensitive material PM.

Figure 8:
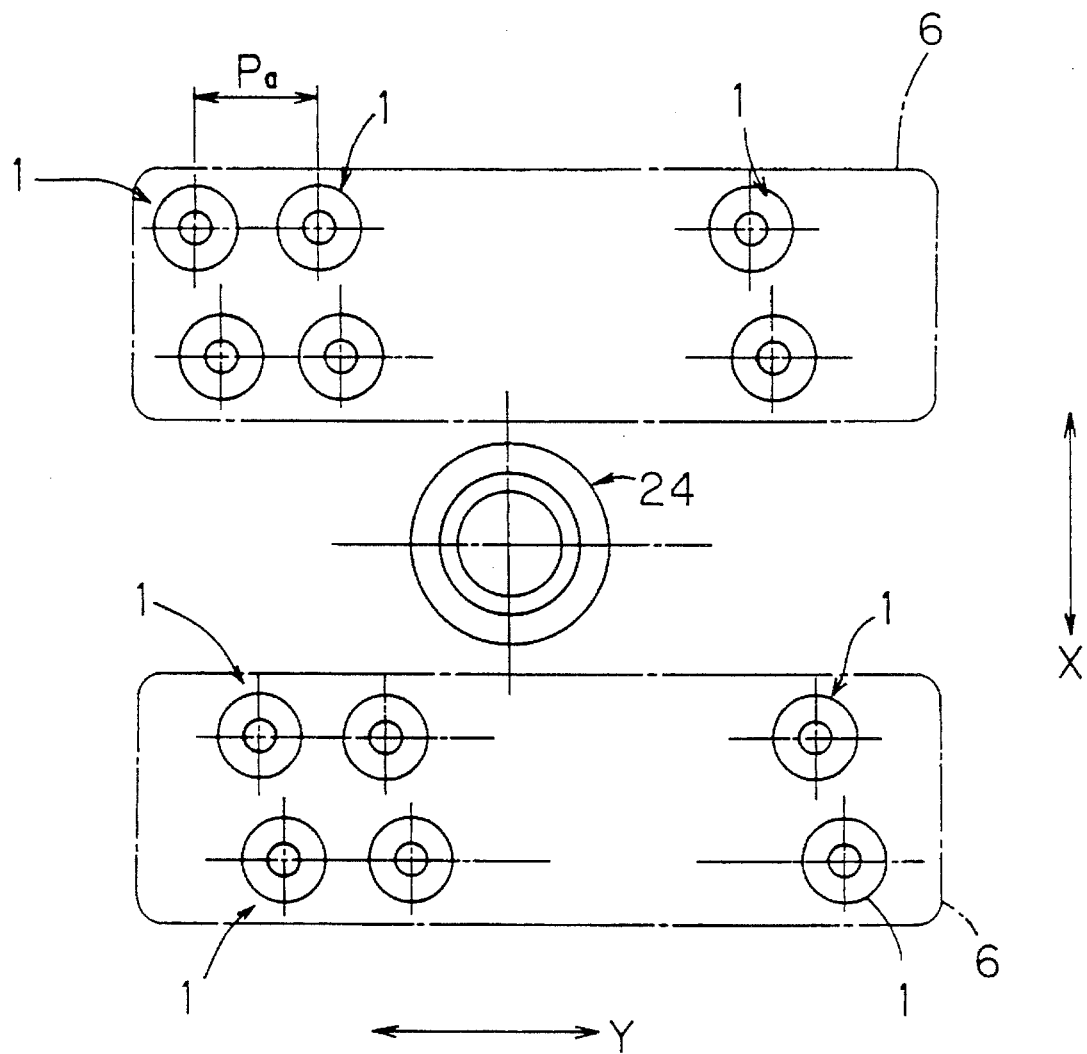
FIG. 8 is a front view of a light source unit.

FIG. 8 is a front view of the light source unit 6. In FIG. 8, the light source unit 6 consists of a plurality of light source parts 1 which are arranged with constant pitches Pa. Each light source part 1 is comprised of a semiconductor laser 2 and a collimating lens 3. A light beam from the semiconductor laser 2 is collimated by the collimating lens 3 into a parallel beam which will be emitted parallel to the optical axis Z (FIGS. 6 and 7). FIG. 8 shows that the light source parts 1 are arranged to partially overlap each other in the primary scanning direction X. This is to prevent a split in scanning lines, that is, separation of adjacent scanning lines from each other due to mechanical dimensional restraints of the light source parts. In addition, to avoid mechanical interference with the reduction optical system 20, the light source parts 1 are divided into two groups in their arrangement (FIG. 8).

Figure 9:
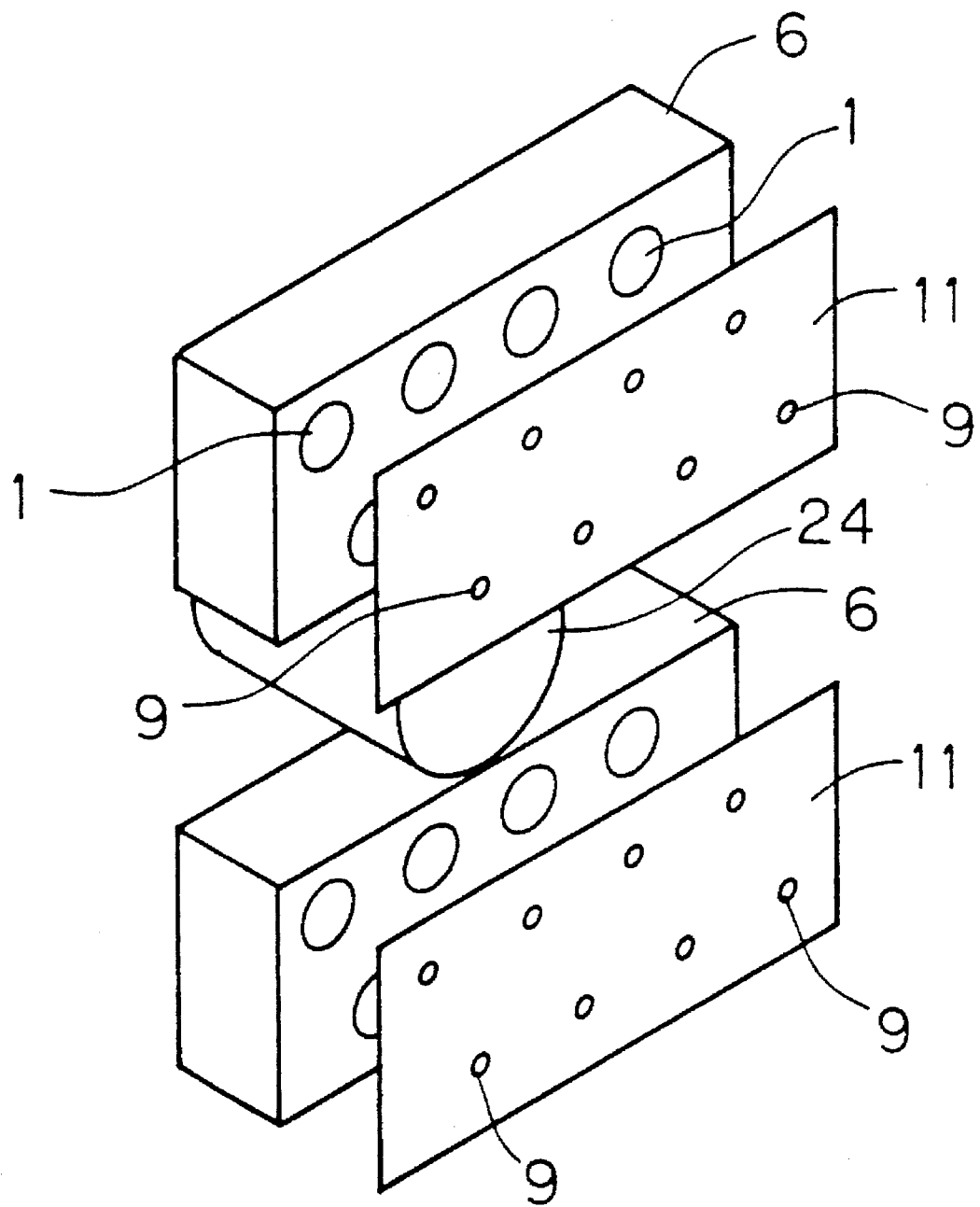
FIG. 9 is a perspective view of the light source unit and elements disposed in the vicinity of the same.

FIG. 9 is a perspective view of the light source unit 6 and elements disposed in the vicinity of the same. In FIG. 9, an aperture plate 11 is disposed at the light emitting side of the light source unit 6. In the aperture plate 11, apertures 9 are formed in the same arrangement pattern as that of the light source parts 1 (FIG. 8). Light beams from the light source parts 1 pass through corresponding apertures 9 toward the reduction optical system 20 (FIGS. 6 and 7). In this preferred embodiment, the aperture plate 11 is located on a focal plane of a parabolic mirror 22.

Figure 10:
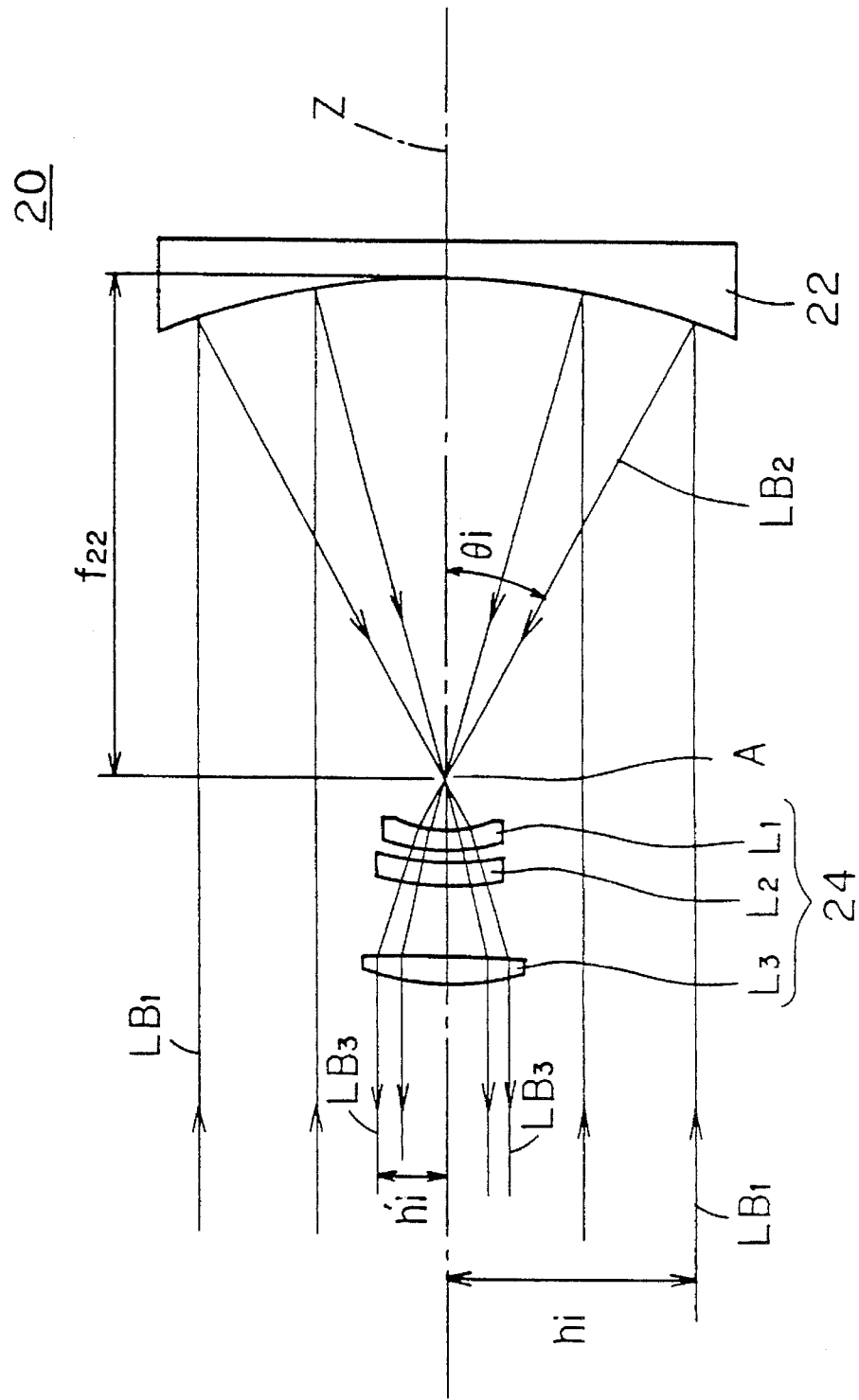
FIG. 10 is a view of a reduction optical system of the second preferred embodiment of the present invention.

FIG. 10 is a view of the reduction optical system 20. Within the reduction optical system 20, the parabolic mirror 22 (which has a focal length $f_{22}$) and a stereographic projection lens 24 are disposed so that their focal points coincide with each other at a predetermined point A, whereby an afocal optical system is realized. Hence, if light beams $LB_1$ from the light source unit 6 travelling parallel to the optical axis Z enter the reduction optical system 20, light beams $LB_3$ from the reduction optical system 20 as well become parallel to the optical axis Z.

The stereographic projection lens 24 is formed by three lenses $L_1$, $L_2$ and $L_3$, for example, as shown in FIG. 10. Assume that an incident angle of light beams $LB_2$ entering the stereographic projection lens 24 after reflected by the parabolic mirror 22 is $\theta i$ and an image height (i.e., the height of the beams from the optical axis Z) is hi', the image height characteristic of the stereographic projection lens 24 is expressed as:

$$hi'=2 \cdot f_{24} \cdot \tan(\theta i/2) \qquad (1)$$

where $f_{24}$ is a focal length of the stereographic projection lens 24. Hence, both the sizes of the apertures 9 of the aperture plate 11 and an object height hi from the optical axis Z are reduced by the reduction optical system 20 at a magnification m1 ($=f_{24}/f_{22}$) at the same time and imaged at a rear focal plane $FP_1$ of the stereographic projection lens 24. The reason for this is as follows. As shown in FIG. 10, when the light beams $LB_1$ parallel to the optical axis Z impinge upon the reduction optical system 20 at the object height hi, the light beams $LB_2$ reflected by the parabolic mirror 22 pass the point A, which is away from the parabolic mirror 22 by the focal length $f_{22}$, at the angle $\theta i$. Here, due to optical characteristics of the parabolic mirror 22, $$\tan(\theta i/2)=hi/(2 \cdot f_{22}) \qquad (2)$$

Therefore, substituting Eq. 2 in Eq. 1, $$\begin{aligned} hi' &= 2 \cdot f_{24} \cdot hi/(2 \cdot f_{22}) \\ &= (f_{24}/f_{22})hi \\ &= m1 \cdot hi \end{aligned} \qquad (3)$$

Hence, the light beams $LB_1$ having equal beam pitches Pa from the light source unit 6 are each converged at the rear focal plane $FP_1$ of the stereographic projection lens 24 so that intermediate images of the aperture 9 are formed with equal spaces from each other on the rear focal plane $FP_1$. It is only when the aperture plate 11 is disposed at the focal plane of the parabolic mirror 22 that images of the apertures 9 are formed on the rear focal plane $FP_1$. If the aperture plate 11 is off the focal plane of the parabolic mirror 22, the aperture images will be off the rear focal plane $FP_1$. The amount of the displacement of the aperture images is determined by a square of the magnification of the reduction optical system 20, i.e., a vertical magnification, as described earlier.

A shown in FIGS. 6 and 7, the afocal optical system 30 is disposed between the reduction optical system 20 and the rotation cylinder 80 and is comprised of a zoom lens 32 which is formed by lenses $L_4$ to $L_9$ and an afocal optical system 34 which is formed by lenses $L_{10}$ and $L_{11}$. Within the afocal optical system 30, a rear focal plane of the zoom lens 32 coincides with a front focal plane of the afocal optical system 34 at a plane $FP_2$, which makes the optical system 30 afocal. A front focal plane of the zoom tens 32 coincides with a rear focal plane of the stereographic projection lens 24 of the reduction optical system 20 at the plane $FP_1$, while the photosensitive material (i.e., recording surface) PM is located at a rear focal plane of the afocal optical system 34. This allows that intermediate images (i.e., aperture images) which are formed at the plane $FP_1$ are reduced with an appropriate magnification by the afocal optical system 30 and focused as aperture images (i.e., beam spots) on the photosensitive material PM.

Thus, in the multibeam recording apparatus according to the second preferred embodiment, since the aperture plate 11, the plane $FP_1$ and the photosensitive material PM are located in optical conjugation with each other, intermediate images of the apertures 9 of the aperture plate 11 are formed on the plane $FP_1$ and further intermediate images (i.e., aperture images) are formed on the photosensitive material (i.e., recording surface) PM. As result, effects similar to those attainable in the first preferred embodiment are achieved. In other words, only if light beams from the respective light source parts 1 are parallel to the optical axis Z and at least a portion of each light beam is irradiated upon the corresponding aperture 9 of the aperture plate 11, inaccurate provision of the light source parts 1 in the direction parallel to the optical axis Z or the directions X and Y which are perpendicular to the optical axis Z will not make it difficult to adjust the light source parts 1 since the aperture images are formed at constant positions.

The foregoing has described a structure where the aperture plate 11 coincides with the focal plane of the parabolic mirror 22 as the second preferred embodiment. However, even if the aperture plate 11 is off the focal plane of the parabolic mirror 22, the effects above can be attained by arranging the respective elements of the apparatus in such a manner that the aperture plate 11 and the photosensitive material PM are in optical conjugation similarly to the first preferred embodiment.

C. Third Preferred Embodiment

Figure 11:
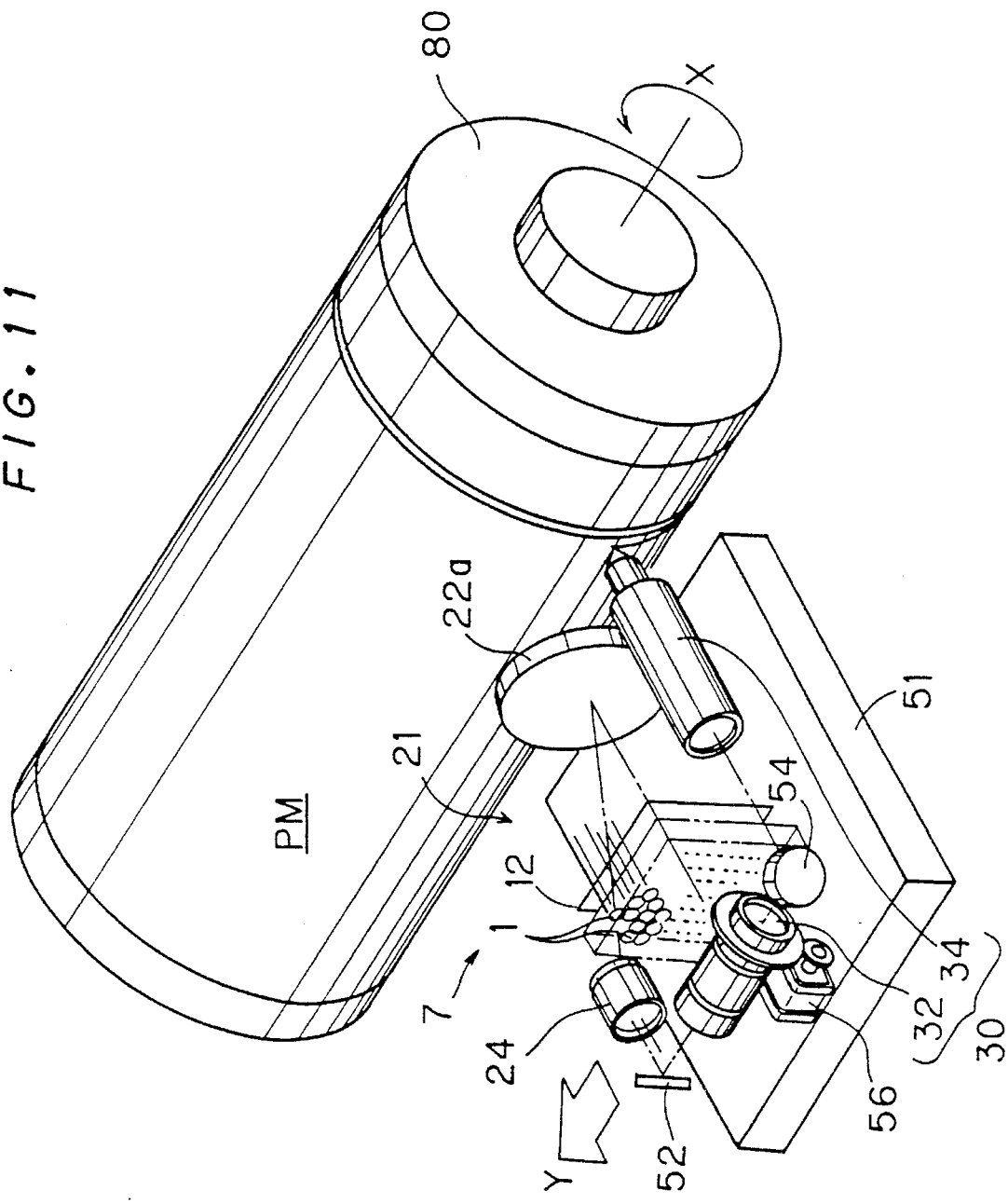
FIG. 11 is a perspective view of a multibeam recording apparatus according to a third preferred embodiment of the present invention.
Figure 12:
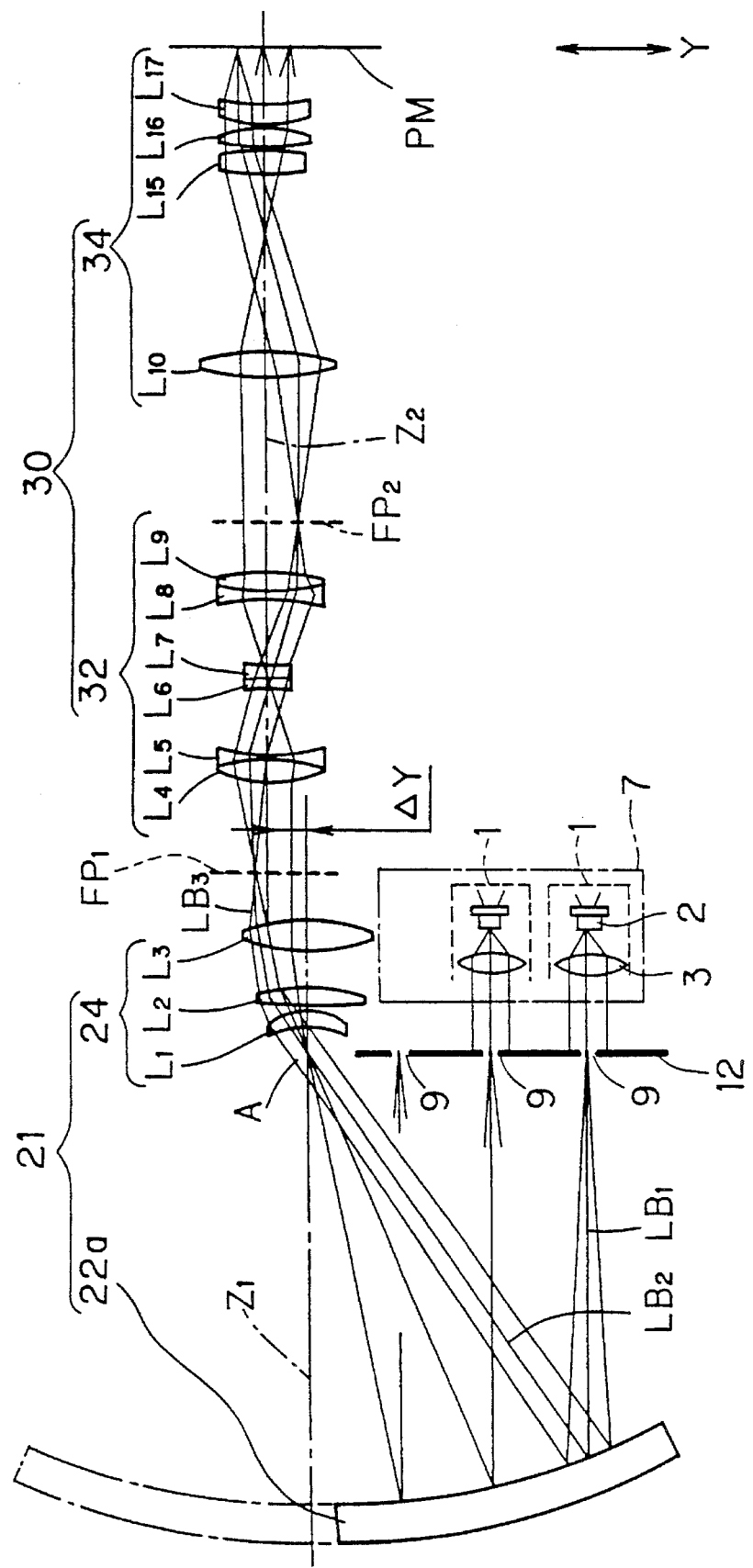
FIG. 12 is a plan view of a multibeam recording apparatus according to the third preferred embodiment of the present invention.

FIGS. 11 and 12 are a perspective view and a plan view, respectively, of a multibeam recording apparatus according to a third preferred embodiment of the present invention. Optical systems used in this embodiment are somewhat similar to those used in the second preferred embodiment except for the following three major differences. First, while portions of the parabolic mirror 22 which are utilized in the second preferred embodiment are those wide portions above and below the optical axis except the central portion, the third preferred embodiment uses one portion of the parabolic mirror 22. This portion, i.e., a region 22a is off a principal axis of the parabolic mirror 22. In general, a parabolic mirror which is formed only by such a region 22a is referred to as "off-axis paraboloid mirror." Hence, in the description hereinafter, a parabolic mirror of such a construction will be referred to as "off-axis paraboloid mirror."

Second, the third preferred embodiment requires that an optical axis $Z_1$ of the reduction optical system (imaging optical system) 21 is displaced from an optical axis $Z_2$ of the afocal optical system 30 by a predetermined distance $\Delta Y$ in the sub scanning direction Y. Although no practical problem will occur even if the two optical axes coincide with each other as in the second preferred embodiment (FIG. 6), when the off-axis paraboloid mirror 22a is used, some of the laser beams $LB_3$ from the reduction optical system 21 will not enter the afocal optical system 30. In sharp contrast, in the third preferred embodiment, since the optical axes are not aligned to each other, the whole afocal optical system 30 is involved in directing the laser beams $LB_3$ toward the photosensitive material PM from the reduction optical system 21 as shown in FIG. 12. Hence, a reduction in size of the afocal optical system 30 is attained.

Third, an arrangement of the light source parts 1 which form a light source unit 7 is the same as the arrangement adopted in the first preferred embodiment.

The third preferred embodiment is otherwise almost the same as the second preferred embodiment, including the feature that an aperture plate 12 and the photosensitive material PM are located in optical conjugation with each other. Hence, light beams from the light source parts 1 pass through the apertures 9 of the aperture plate 12 and impinge on the off-axis paraboloid mirror 22a where they are reflected toward the stereographic projection lens 24. The stereographic projection lens 24 images the light beams at its rear focal plane $FP_1$, whereby intermediate images of the apertures 9 are formed equidistantly from each other at the rear focal plane $FP_1$. Having been imaged as the intermediate images, the light beams enter the zoom lens 32 through a mirror 52 so that further intermediate images of the apertures 9 are formed at a rear focal plane $FP_2$ of the zoom lens 32. The light beams then enter the afocal optical system 34, which is formed by four lenses $L_{10}$, $L_{15}$, $L_{16}$ and $L_{17}$, through a mirror 54. The light beams are finally converged as aperture images (i.e., beam spots) on the photosensitive material PM by the afocal optical system 34. By step feeding a base 51 on which the light source unit 7, the aperture plate 12, the reduction optical system 20 and the afocal optical system 30 are fixed in the sub scanning direction Y, a two-dimensional image is recorded on the photosensitive material PM. A change in the image recording density is realized by adjusting the magnification of the zoom lens 32 by means of a motor 56.

Thus, similarly to the first and the second preferred embodiments, a slight displacement of the light source parts 1 would not prevent aperture images from being formed at constant positions and therefore this would not make it difficult to adjust the light source parts 1, since the aperture plate 12 and the photosensitive material PM are positioned in optical conjugation with each other in the third preferred embodiment.

In the third preferred embodiment, the aperture plate 12 is located to coincide with the focal plane of the parabolic mirror 22. However, even if the aperture plate 12 is displaced from this focal plane, the effects just described are attained similarly to the first preferred embodiment only by arranging the respective elements of the apparatus in such a manner that the aperture plate 12 and the photosensitive material PM are in optical conjugation with each other.

D. Fourth Preferred Embodiment

Figure 13:
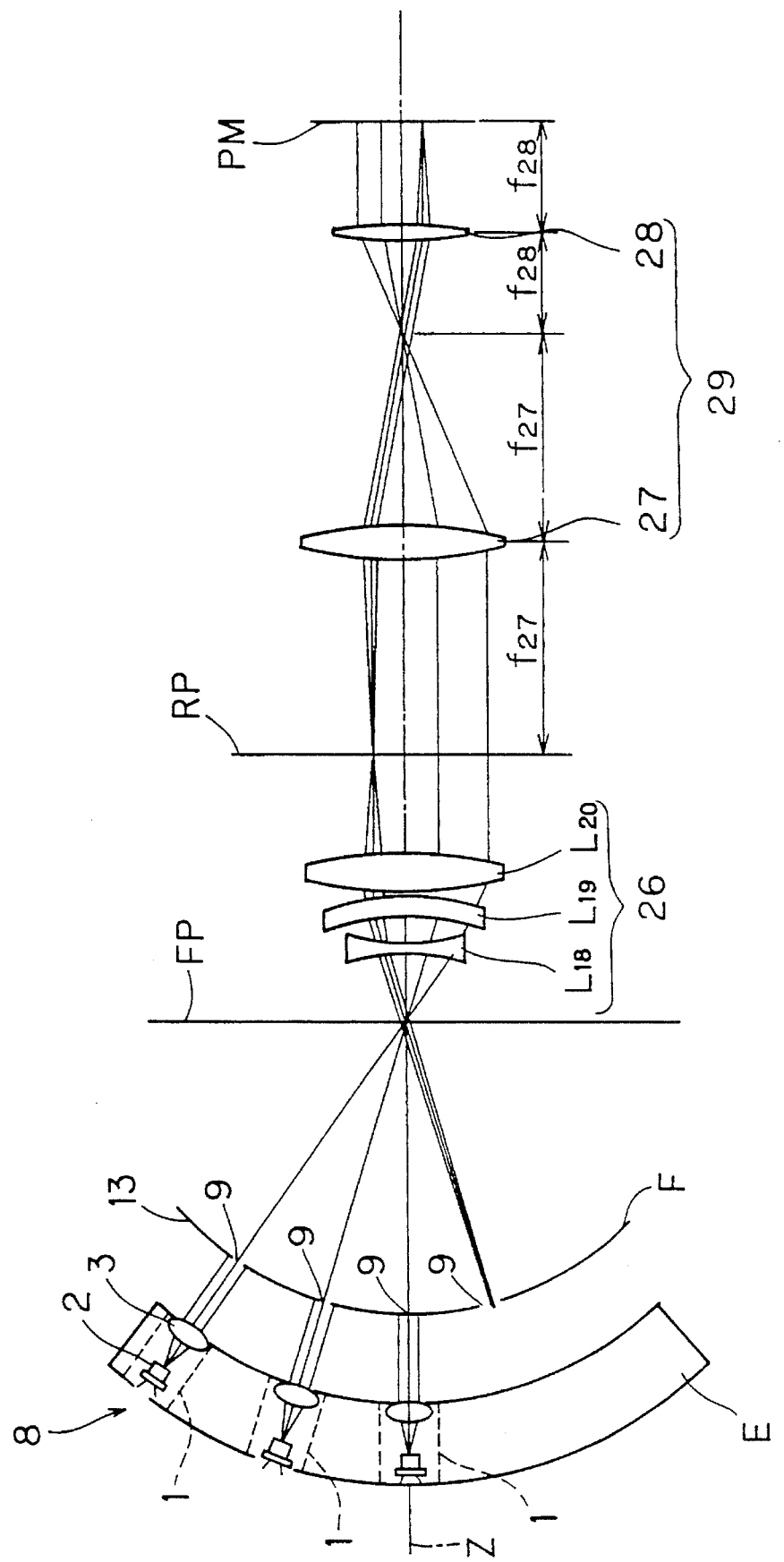
FIG. 13 is a plan view of a multibeam recording apparatus according to a fourth preferred embodiment of the present invention.

FIG. 13 is a plan view of a multibeam recording apparatus according to a fourth preferred embodiment of the present invention. This multibeam recording apparatus is comprised of a light source unit 8 in which a plurality of light source parts 1 are arranged in an arrangement pattern which will be described later on a spherical surface E, an aperture plate 13 in which a plurality of apertures 9 are formed in a spherical surface F, an fθ lens (imaging optical system) 26 which is formed by three lenses $L_{18}$ to $L_{20}$, an afocal optical system 29 which is formed by lenses 27 and 28, and a rotation cylinder 80 for holding the photosensitive material PM.

Figure 14:
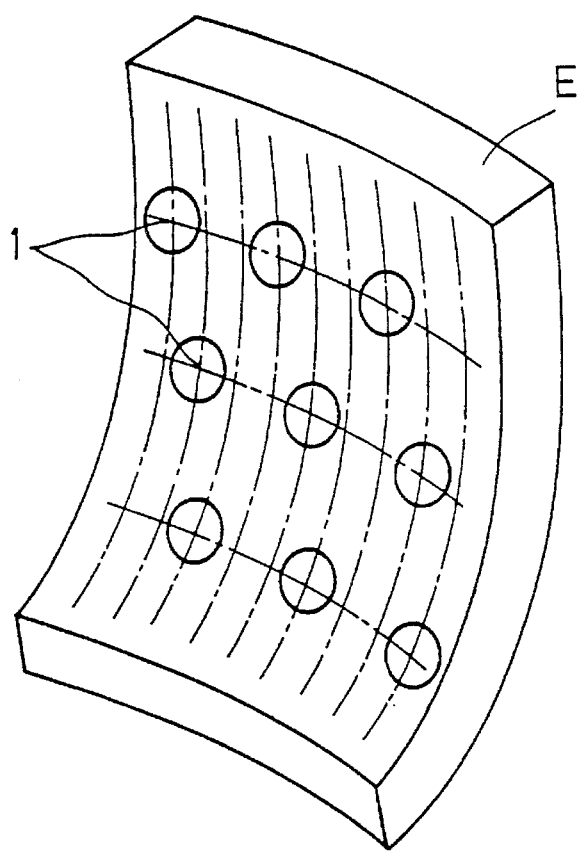
FIG. 14 is a perspective view showing an arrangement of light source parts.
Figure 15:
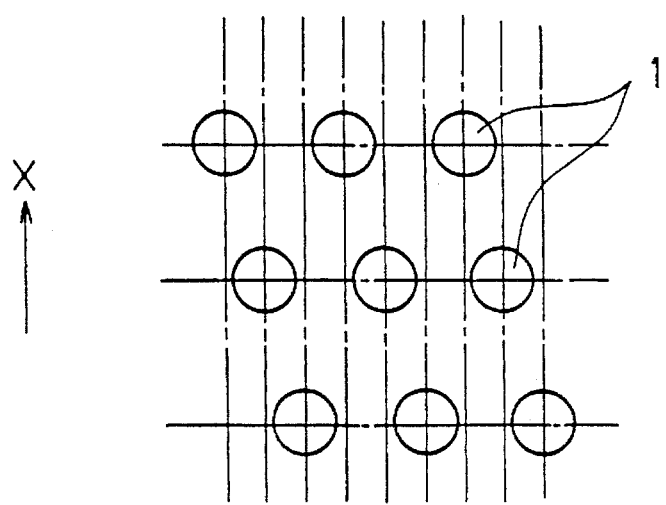
FIG. 15 is a plan view showing the arrangement of light source parts.

FIGS. 14 and 15 are a perspective view and a plan view, respectively, showing the arrangement (arrangement pattern) of the light source parts. The light source parts 1 each consists of a semiconductor laser 2 and a collimating lens 3 are arranged two-dimensionally with equal distances from each other on the spherical surface E whose center is on a front focal plane FP of the fθ lens 26. That is, as shown in FIG. 15, the light source parts 1 are arranged to partially overlap each other in the primary scanning direction X. Further, the principal rays of the light beams from the light source parts 1 travel toward the front focal plane FP of the fθ lens 26.

The aperture plate 13 is formed in the configuration of the partial spherical surface F whose center is on the front focal plane FP of the lens 26 as shown in FIG. 13, and located at the light emitting side of the light source unit 8. In the aperture plate 13, the apertures 9 are arranged in a similar arrangement pattern to the arrangement pattern of the light source parts 1 (FIGS. 14 and 15) so as to be each located on an imaginary line between the relevant light source part 1 and the front focal plane FP of the fθ lens 26. In the fourth preferred embodiment, though disposed on spherical surfaces because of the two-dimensional arrangement of the light source parts 1, the light source parts 1 and the aperture plate 13 may be each disposed on a curved surface instead when the light source parts 1 are arranged one-dimensionally (i.e., in a row or a column).

As can be seen in FIG. 13, the fθ lens 26 and the afocal optical system 29 are disposed in this order on the optical axis Z. This embodiment requires that a rear focal plane RP of the fθ lens 26 coincides with a front focal plane of the lens 27, a rear focal plane of the lens 27 coincides with a front focal plane of the lens 28 and the photosensitive material PM is positioned to approximately coincide with a rear focal plane of the lens 28. Hence, light beams from the apertures 9 are converged on the photosensitive material PM through the fθ lens 26 and the afocal optical system 29, thereby images of the apertures 9 being formed on the photosensitive material PM. As a result, effects as described earlier in relation to the precedent preferred embodiments are attained.

E. Fifth Preferred Embodiment

Figure 16:
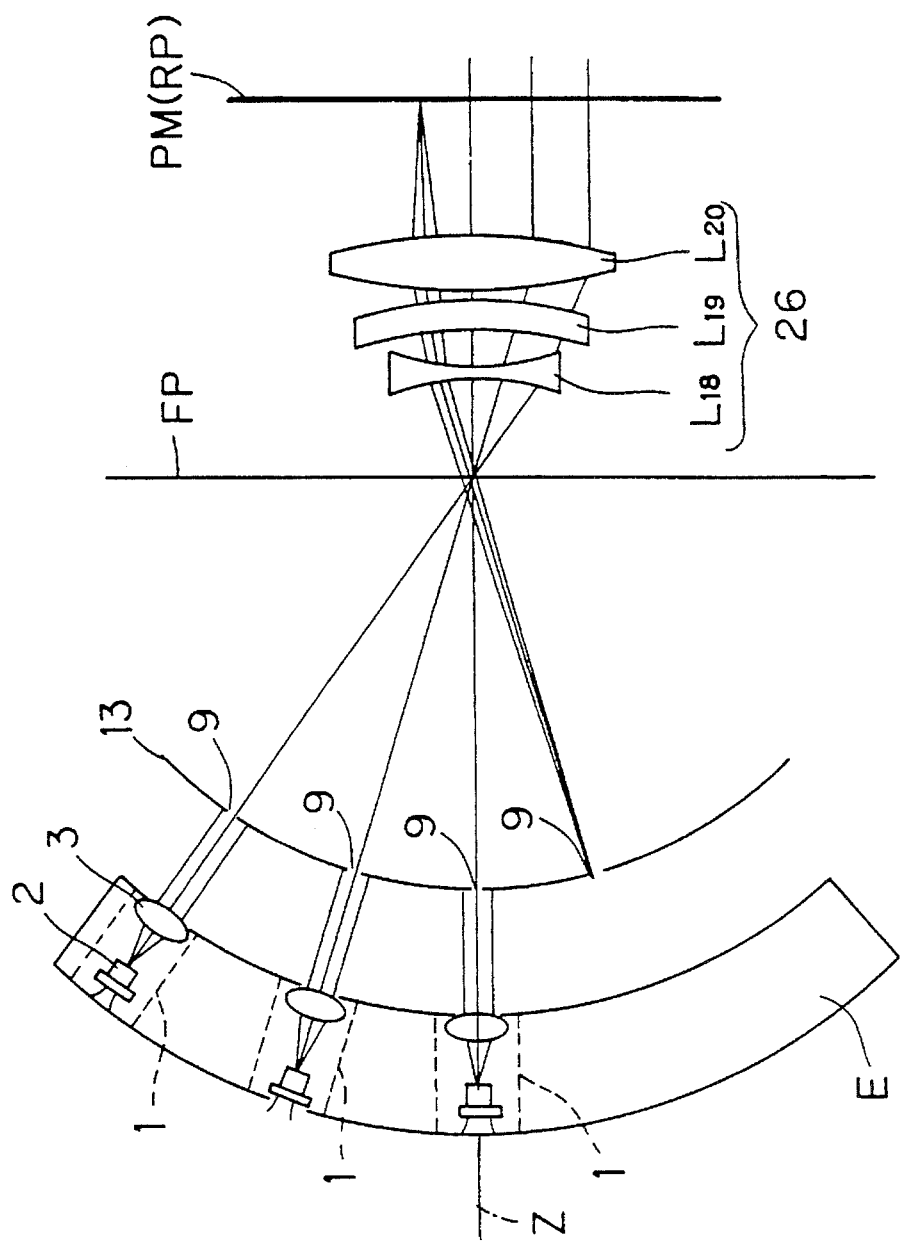
FIG. 16 is a plan view of a multibeam recording apparatus according to a fifth preferred embodiment of the present invention.
Figure 17:
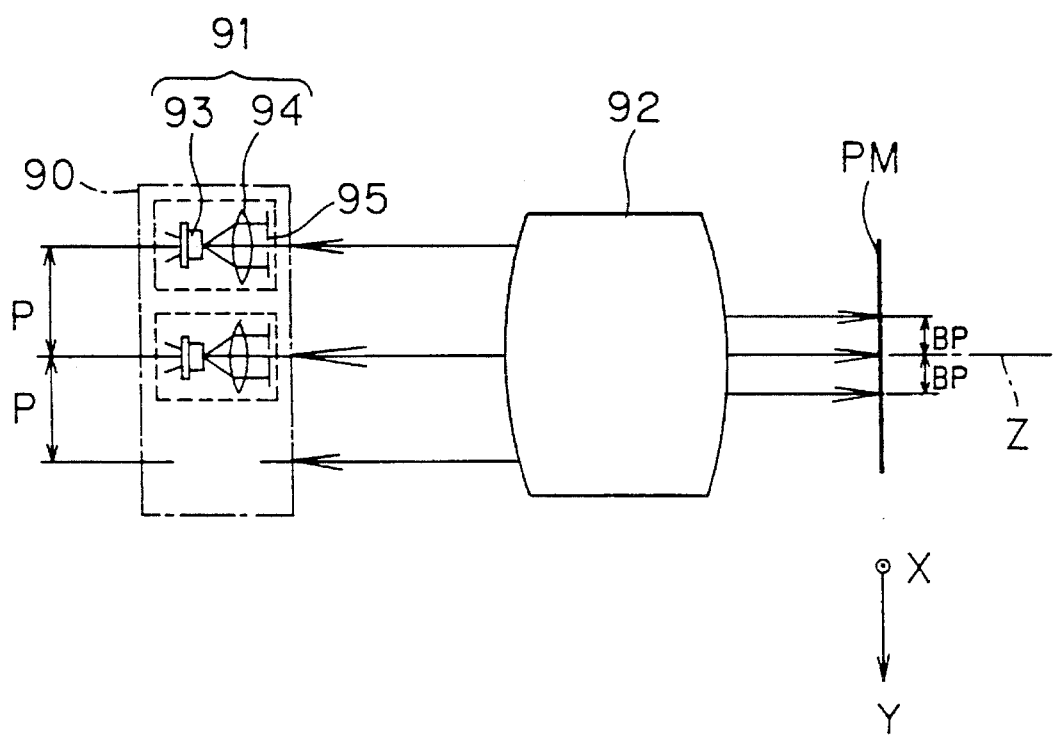
FIG. 17 is a view of a conventional multibeam recording apparatus.

FIG. 16 is a plan view of a multibeam recording apparatus according to a fifth preferred embodiment of the present invention. The multibeam recording apparatus according to the fifth preferred embodiment is similar to the multibeam recording apparatus according to the fourth preferred embodiment except for omission of the afocal optical system 29 which is formed by the lenses 27 and 28 and positioning of the photosensitive material (i.e., recording surface) PM at the rear focal plane RP of the fθ lens 26. Hence, in addition to the effects described earlier, the fifth preferred embodiment simplifies the structure of the optical systems of the multibeam recording apparatus.

While the invention has been described in detail, the foregoing description is in all aspects illustrative and not restrictive. It is understood that numerous other modifications and variations can be devised without departing from the scope of the invention.

What is claimed is:

1. A multibeam recording apparatus for irradiating a plurality of light beams onto a recording surface to recording an image, said multibeam recording apparatus comprising:

a light source unit including a plurality of light source parts which are arranged in a first arrangement pattern, each of said light source parts emitting a single light beam;

an imaging optical system having an optical axis, said imaging optical system being disposed between said light source unit and said recording surface;

an aperture plate having a plurality of apertures which are arranged in a second arrangement pattern similar to said first arrangement pattern, said aperture plate being disposed between said light source unit and said imaging optical system so that each of said apertures faces said corresponding light source part;

said aperture plate and said recording surface being in optical conjugation; and each of said light source parts irradiating a light beam upon an area which includes the aperture corresponding to the light source part, resulting in images of the apertures being formed on the recording surface.

2. A multibeam recording apparatus of claim 1, wherein said light source parts are disposed on a flat surface substantially perpendicular to said optical axis and said aperture plate is formed in the configuration of the flat surface, and wherein said first and second arrangement patterns are identical to each other.

3. A multibeam recording apparatus of claim 2, wherein said imaging optical system comprises a first optical element having a first finite focal length and a second optical element having a second finite focal length, said first and second optical elements being disposed on said optical axis in sequential order from said light source unit side to said recording surface side, and wherein the rear focal point of said first optical element substantially coincides with the front focal point of said second optical element.

4. A multibeam recording apparatus of claim 3, wherein said first and second optical elements are formed by a lens.

5. A multibeam recording apparatus of claim 3, wherein said first optical element is a paraboloid mirror while said second optical element is formed by a lens.

6. A multibeam recording apparatus of claim 3, wherein said aperture plate is disposed on the front focal plane of said first optical element.

7. A multibeam recording apparatus of claim 6, wherein said recording surface is disposed on the rear focal plane of said second optical element.

8. A multibeam recording apparatus of claim 1, wherein said light source parts are disposed on the spherical surface and said aperture plate is formed in the configuration of the spherical surface.

9. A multibeam recording apparatus of claim 8, wherein the centers of the spherical surfaces is on the front focal plane of said imaging optical system.

10. A multibeam recording apparatus of claim 9, wherein said imaging optical system is a fθ lens which is disposed on said optical axis.

11. A multibeam recording apparatus of claim 10, wherein said recording surface is disposed on the rear focal plane of said imaging optical system.

12. A multibeam recording apparatus of claim 1, wherein said light source unit comprises a plurality of light source arrays which are formed by said plurality of light source parts, said plurality of light source arrays being disposed in direction of perpendicular to said optical axis.

13. A multibeam recording apparatus of claim 1, further comprising an afocal optical system which is disposed between said imaging optical system and said recording surface.

14. A multibeam recording apparatus of claim 13, wherein said afocal optical system includes a zoom lens.

15. A multibeam recording apparatus of claim 14, wherein said afocal optical system further includes driving means for moving said zoom lens along said optical axis.

16. A multibeam recording apparatus of claim 1, wherein each of the first and the second arrangement patterns is a two-dimensional arrangement.

17. A multibeam recording apparatus of claim 2, wherein each of the first and the second arrangement patterns is a two-dimensional arrangement.

18. A multibeam recording apparatus of claim 8, wherein each of the first and the second arrangement patterns is a two-dimensional arrangement.

19. A multibeam recording apparatus of claim 12, wherein each of the first and the second arrangement patterns is a two-dimensional arrangement.

20. A multibeam recording apparatus of claim 13, wherein each of the first and the second arrangement patterns is a two-dimensional arrangement.

* * * * *